United States Patent [19]

Plotto

[11] 4,212,044
[45] Jul. 8, 1980

[54] PLATFORM FOR MAGNETIC TRANSDUCERS HAVING DUST DIVERTER MEANS

[75] Inventor: Michel Plotto, Plaisir, France

[73] Assignee: Compagnie Internationale pour l'Informatique, Paris, France

[21] Appl. No.: 958,840

[22] Filed: Nov. 8, 1978

[30] Foreign Application Priority Data

Nov. 18, 1977 [FR] France .................. 77 34801

[51] Int. Cl.² .................. G11B 5/60; G11B 5/10; G11B 17/32
[52] U.S. Cl. .................. 360/103; 360/129
[58] Field of Search .................. 360/103–104, 360/122, 128–129, 130

[56] References Cited

U.S. PATENT DOCUMENTS

| 3,657,710 | 4/1972 | Billawala | 360/103 |
| 3,678,482 | 7/1972 | Billawala | 360/103 |
| 3,855,625 | 12/1974 | Garnier et al. | 360/103 |
| 4,081,846 | 3/1978 | Roscamp et al. | 360/103 |

*Primary Examiner*—John H. Wolff
*Attorney, Agent, or Firm*—Kerkam, Stowell, Kondracki & Clarke

[57] ABSTRACT

A fly off transducer platform or carrier according to the invention comprises a platform for supporting at least one transducer for reading and writing from and onto a data carrier such as a magnetic disc which is driven past the transducer in a given direction and sense. The platform has on its face adjacent the data carrier at least one air gap carried by a skid whose major dimension is parallel to the said given direction. The front face of the said skid, with reference to the said sense of movement of the data carrier, forms a diverter blade to force any unwanted contaminant material to at least one side of the said skid and thus prevents this material from collecting at the air gap.

12 Claims, 2 Drawing Figures

PLATFORM FOR MAGNETIC TRANSDUCERS HAVING DUST DIVERTER MEANS

CROSS REFERENCE TO RELATED APPLICATIONS

The present invention may be employed in combination with the transducer carriers or platforms which are the subject matter of commonly-assigned copending application, Ser. No. 958,839, filed Nov. 8, 1978 by Michel Plotto; and Ser. No. 882,592 filed Mar. 2, 1978 by Jean Pierre Lazzari et al.

BACKGROUND OF THE INVENTION

1. Field of the Invention

This invention relates to platforms or carriers incorporating at least one magnetic transducer for reading from and writing on a data carrier. It is applicable in particular to magnetic read/write transducers for magnetic peripherals of data processing systems, in particular disc memories.

2. Description of the Prior Art

In present day data processing systems, increasingly frequent use is being made of magnetic disc memories, by reason of their storage capacity and the relatively short time which is taken by the magnetic read/write transducers to access data contained anywhere on the discs from the time when the transducers receive an order to access this data from the said processing system.

It is known that magnetic discs carry data in concentric circular recording tracks whose radial width does not exceed a few hundredths of a millimeter and which generally cover the major portion of both faces of the discs.

In operation, the discs are rotatably driven at constant speed by an electric motor. To enable data to be written on and read from a disc, magnetic transducers are arranged above each face of the disc at a distance of a few $\mu$m. Current practice is usually to associate a single platform or carrier provided with one or more transducers with each face of a disc. A platform fitted with a plurality of transducers becomes necessary when it is desired to achieve a substantial reduction in the time taken by any transducer to access any item of data contained on the face of the disc.

The transducers are generally magnetic transducers containing a magnetic circuit which has an air gap and a winding arranged around it. The air gap enables data to be read from and written onto the discs. Generally, but not exclusively, transducer carriers or platforms having one or more transducers are in the form of a relatively rectangular parallelpiped, whose major face adjacent the disc, termed the lower face, contains the air gaps of the transducers. The opposite major face, termed the upper face, containing the electrical points and wires which enable the windings of the transducers to be connected to the electrical circuits of the disc memory with which they are associated.

When the transducers of an associated platform are not performing the operations of reading or writing data from or onto the associated face of the disc, the platform occupies, in relation to the disc, a so-called "rest" position in relation to the disc which is different from that which it occupies during reading or writing.

Among the various kinds of platforms of this nature, the platforms to which the invention relates are those usually known as "unstick from contact" or "fly off" transducer carriers or platforms. These types of platforms are being more readily accepted and more widely used in the industry. Such carriers have a lower major face, termed the flight surface, which rests on the associated face of the disc when the carriers are in the rest position (the disc being stationary). The flight surface has a first part termed the main flight surface which is in the form of skids which rest on the disc when the latter is stationary, and a second part in the form of a bevel which is inclined in relation to the skids and which is situated at the "front" of the platform. Conventional usage defines the "front" of the flight surface as that part of the surface which, when the face of the magnetic disc associated with the platform is travelling past the flight surface, is the first in time to have pass before it the data on this face of the disc. Similarly, the part of this surface which is the last in time to have pass before it the same data is termed the rear of the flight surface. These definitions will be used throughout the instant specification and claims. The air gaps of the transducers are situated at the rear of the flight surface and carried by the skids.

When it is desired to cause the transducer platform to move from its rest position to its flying position above the face of the associated magnetic disc, it is merely necessary to set the disc in rotation. After a fairly short period, the platform rises by virtue of the lifting effect created by the bevel and rotation of the disc. When the disc reaches its nominal speed of rotation, the platform is in the flying position. The surface of the skids are inclined relative to the face of the disc and this imparts to the carrier enough lift for it to fly stably above the disc. The platform is thus enabled to fly by the lift from the skids.

When the disc is turning, dust or any other similar unwanted contaminant material infiltrates between the disc and the flight surface of the platform. Because the air gaps are situated at the rear of the skids, which in flight form an angle with the disc, this dust becomes concentrated in the region of the air gaps. There is thus a danger of the dust clogging the air gaps and thereby adversely affecting the signal read from or written onto the disc by the transducers as well as the quality of the facing surfaces of the platform and the associated disc.

It can, therefore, be seen how advantageous it would be to have a means of forcing the dust away from the air gaps, and if possible, away from the skids so that no dust whatever is picked up by the carrier.

It is precisely to this problem that the present invention provides a solution.

SUMMARY OF THE INVENTION

A platform according to the invention comprises at least one transducer for reading and writing from and on a data carrier which travels past the transducer in a given direction and sense, and which has on its face adjacent the data carrier at least one air gap carried by a skid whose major dimension is parallel to the said given direction. The front face of the said skid, with reference to the said sense of movement of the data carrier, forms a diverter blade to force any unwanted contaminant material to at least one side of the said skid and thus prevents this material from collecting at the air gap.

BRIEF DESCRIPTION OF THE DRAWINGS

The features and advantages of the invention will be more clearly apparent from the following description, which is given with reference to the accompanying drawings. In the drawings.

DESCRIPTION OF THE PREFERRED EMBODIMENTS

Figure 1:
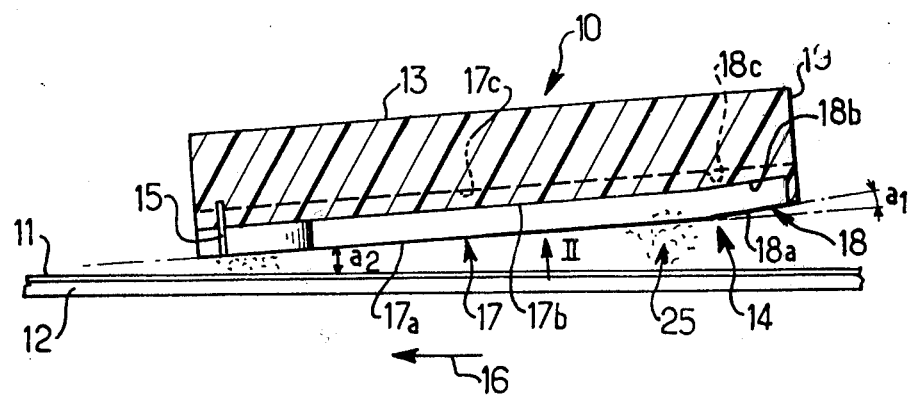
FIG. 1 is a sectional view taken along line I—I of an embodiment of the invention of FIG. 2 showing an transducer carrier or platform having six air gaps and associated with a magnetic disc.
Figure 2:
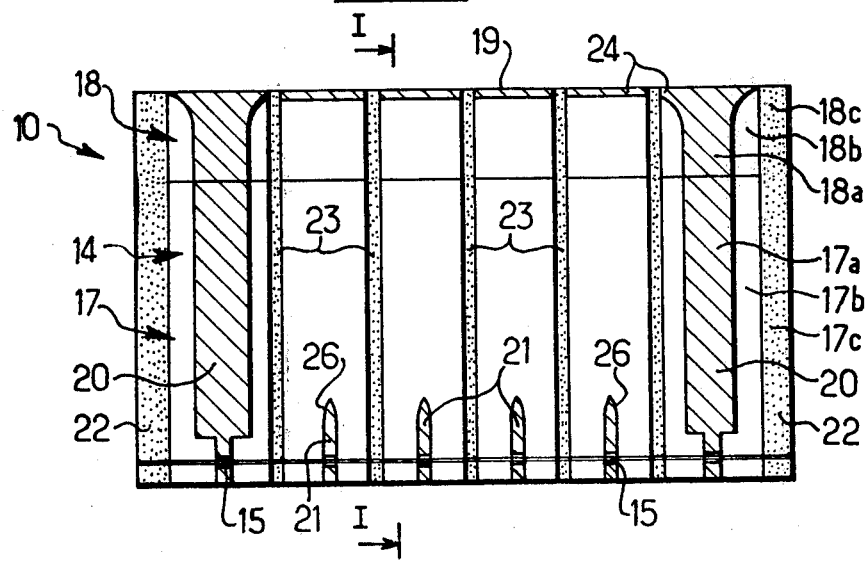
FIG. 2 is a view from below of the platform illustrated in FIG. 1 with the disc removed for clarity.

In the embodiment shown in FIGS. 1 and 2, the platform or carrier 10 cooperates with a plurality of tracks 11 (only one of which is shown) on a disc 12 and is formed by a substantially parallelpiped rectangular body 13 of which the face 14 adjacent the disc 12 forms the flight surface of the carrier. Platform 10 includes at least one magnetic read/write transducer and preferably a plurality of magnetic transducers. In the illustrated embodiment, carrier 10 includes six transducers, as indicated by the six air gaps 15 in the drawings.

In FIG. 1, the platform 10 is shown in the position in which it flies above the disc 12 when the latter moves in the direction of arrow 16. Using this arrow as a reference, it may be said that the air gaps 15 are arranged at the rear of the carrier 10.

As shown in FIG. 1, the flight surface 14 has first and second surfaces which extend in differently inclined planes, namely a main lifting surface 17 for flight which has the air gaps 15 at its rear, and a bevelled unstick surface 18 lying between the main flight surface 17 and the front edge 19 of the platform 10. The angle $a_1$ of the bevel 18 relative to the surface 17 is in fact very small, for example, of the order of 0.5, and has, therefore, been enlarged in FIG. 1 to clarify the drawing.

As can be seen from the Figures, the main flight surface 17 and the bevelled surface 18 break down into a plurality of parts which lie in three different planes a, b and c. The outer planes 17a, 18a are represented by hatching in FIG. 2 and form the lifting surface of the platform 10, whose parts form which are termed "skids". The base planes 17b, 18b are set back at a given distance from the outer planes 17a, 18a and are shown in white in FIG. 2. The inner planes 17c, 18c are set back from the base surfaces 17b, 18b, are co-planar in the embodiment selected, and are indicated in FIG. 2 by dotted areas.

The skids which define the flight surface of the platform 10 consists of two main outer skids 20 which are disposed at opposite sides of the flight surface and which extend in the lengthwise direction of the platform or carrier in the direction of arrow 16 and which are of considerable width, and of four auxiliary or intermediate skids 21 which are parallel to the main skids 20 but of lesser width. These intermediate skids 21 are provided to bring the air gaps 15 into close proximity with the tracks 11 on the disc 12, in the same way as the main skids 20 and as shown in FIG. 1. The plane 17c, 18c is defined by two lateral edge grooves 22 and intermediate grooves 23 which are formed in the base surfaces 17b, 18b to reduce the lift from these surfaces.

When the disc 12 is stationary, the platform 10 is in contact with the disc 12 via its main flight surface 17, that is to say via the whole surface area 17a of the skids 20, 21. As soon as the disc 12 starts to rotate, the bevelled surface 18a forms a lifting surface which enables the carrier 10 to draw away from the disc 12, i.e. the natural tendency for the carrier 10 to stick to the surface of the disc 12 is broken so that the platform may be supported on a cushion of air between the disc and the surface 17. In flight, the platform 10 is supported in essence by the main flight surface 17a which forms an angle $a_2$ of the order of 0.1 milliradians with the disc 12, which places the air gaps at approximately 0.5 μm from the tracks 11, and the front end of the bevel 18 at approximately 5 μm, where the length of the platform is approximately 4 millimeters. The base surfaces 17b, 18b make only a very small contribution to the lift of the platform 10, and do so to an even smaller extent by reason of the intermediate grooves 23 which divide up the lifting area of the base surfaces 17b, 18b.

As shown in FIG. 2, the main skids 20 are widened out where the bevel 18 is situated close to the front edge 19 of the carrier 10 to form an additional surface 24 which improves the lift to the platform at take off.

In the prior art, as shown, for example, in my copending application (Ser. No. 958,839) (corresponding to French application 77.34346), the auxiliary skids 21 are uniformly straight for the whole length of the platform 10 front to back in the direction of arrow 16, like the main skids 20. In this way, if particles 25 of dust or any similar undesirable material are present on the surface of the disc 12, or enter the space between the carrier 10 and the disc 12, this dust tends to concentrate towards the rear of the platform 10, as shown in FIG. 1 and be compressed in the region of the air gap 15. These particles have the unfortunate effect of clogging the air gap and adversely affecting the reading or writing of signals and also the quality of the surfaces of the auxiliary skids 21 and of the tracks 11 on the disc 12.

In accordance with the invention, the front face 26 of each auxiliary skid 21 forms a diverter blade to force any undesirable particles 25 to at least one side of the skids and thus to prevent this material from collecting at the air gaps 15.

In the embodiment illustrated, the blade formed by the front faces 26 of the auxiliary skids 21 advantageously pointed or is V shape, which is suitable shape to force the particles of dust 25 to either side of each auxiliary skid 21. The length of the auxiliary skids is preferably less than the front to back length of the carrier 10.

The front faces 26 of the auxiliary skids 21 could, of course, be of other shapes. For example, the faces may be bevelled. This would force the dust to only one side, but it still would advantageously minimize the build up of contaminants at the air gaps.

It can be seen from FIG. 1 that by virtue of the foreshortened skids 21 the dust does not concentrate between the auxiliary skids 21 and the tracks 11 of the discs 12 but rather between the base surface 17b and the tracks 11. Bearing in mind the fact that in the embodiment illustrated the surface 17b is set back from the surface of the skids 17a by 4 μm and that in flight the surface 17a is 1 μm away from the tracks 11 at the point where the air gaps 15 are situated, the dust is diverted by the front faces 26 of the skids 21 and is channelled into a space which is five times larger than the space which was available to it in the prior art.

In this way clogging of the air gaps of the platform is considerably reduced and the life of the head is thus increased to a corresponding degree while at the same time preserving a high standard in the reading of the signals picked up on the tracks 11 and preserving the quality of the main flight surface 17a of the platform 10 and of the tracks 11 on the disc 12.

The invention is particularly advantageous for a platform or carrier having a plurality of integrated magnetic read/write transducers. Such transducers are well known and described in U.S. Pat. Nos. 3,723,665 and 3,846,841, the subject matter of which is hereby incorporated by reference.

In general terms, the invention is in no way restricted to the embodiment described and illustrated and in fact covers all means which form technical equivalents of the means described, as well as combinations of these if the combinations are made within the scope of the invention as defined by the following claims.

I claim:

1. In a transducer platform for reading and writing from and onto a data carrier adapted to be driven past the platform from front to rear along its lengthwise dimension, said platform having major face adapted to be disposed adjacent the data carrier, said major face including a plurality of skids including at least two symmetrically disposed outer skids defining the flight surface of the platform and at least one intermediate skid having a magnetic transducer including an air gap to enable data to be read from and written onto the data carrier by said transducer, said skids having a major dimension parallel to the lengthwise dimension of said platform and having a front edge and a rear edge, the rear edge corresponding to the rear of the platform with reference to the direction of movement of the data carrier the improvement comprising a diverter means having a leading pointed edge formed in the front of said at least one intermediate skid for forcing unwanted contaminant material to the side of the said intermediate skid and thus to minimize build-up of said material around the skid and adjacent the data carrier, said diverter means comprising a surface disposed at an angle with respect to the major dimension of said at least one skid, said magnetic transducer being disposed adjacent the trailing edge of said at least one intermediate skid.

2. A platform according to claim 1 wherein the leading edge of said diverter means is v shape.

3. A platform according to claim 1 wherein the leading edge of said diverter means is bevel shape.

4. A platform as claimed in claim 1, 2 or 3 wherein the length of the said at least one intermediate skid is less than the front to back length of the platform in the said given direction.

5. A transducer platform for supporting a plurality of transducers for reading and writing data from and onto a data carrier adapted to be driven past an adjacent major face of the platform, from the front to the rear thereof as defined by the direction of movement of the data carrier relative to said platform, said adjacent face of the platform including a main flight surface having a plurality of skids including at least two symmetrically disposed outer skids and at least one intermediate skid each said intermediate skid surface supporting a transducer having an air gap adjacent its trailing edge, said skids being disposed parallel to each other and extending lengthwise of said platform, between the front and rear thereof, said at least one intermediate skids being shorter in length than said outer skids and having its leading edge facing the front of said platform pointed to form a diverter blade for forcing unwanted contaminant material to the side of said skid to minimize build up of said material around said skid and the data carrier.

6. A transducer platform as set forth in claim 5 wherein said two outer skids are disposed at opposite sides of the flight surface and further includes a plurality of intermediate skids, each of said intermediate skids being shorter in length than said outer skids and each having its face facing the front of said platform shaped to form diverter blades.

7. A transducer carrier as set forth in claim 5 or 6 wherein said front face of said intermediate skids is V shape.

8. A transducer carrier as set forth in claims 5 or 6 wherein said front face of said intermediate skids is bevel shape.

9. A transducer platform for supporting a plurality of transducers for reading and writing data from and onto a data carrier adapted to be driven past an adjacent major face of the platform, from the front to the rear thereof as defined by the direction of movement of the data carrier relative to said platform, said adjacent face of the platform including a main flight surface having two major outer skids at least one intermediate skid including a transducer having an air gap adjacent the trailing edge thereof, said intermediate skid being disposed parallel to and extending lengthwise of said platform between the front and rear thereof, said intermediate skid having an edge facing the front of said platform shaped to form a pointed diverter blade for forcing unwanted contaminant material to the side of said skid to minimize build up of said material around said skid and the data carrier.

10. A transducer platform as set forth in claim 9 wherein said two outer skids are disposed at opposite sides of the flight surface and further including a plurality of intermediate skids, each of said intermediate skids having its edge facing the front of said platform shaped to form diverter blades.

11. A transducer carrier as set forth in claims 9 or 10 wherein said edge of said intermediate skids is V shape.

12. A transducer carrier as set forth in claims 9 or 10 wherein said edge of said intermediate skids is bevel shape.

* * * * *